United States Patent
Nyffenegger et al.

(10) Patent No.: US 7,511,259 B2
(45) Date of Patent: Mar. 31, 2009

(54) SMART INTEGRATED DISTRIBUTED LIGHT-POWERED PROCESS CONTROL SYSTEM

(75) Inventors: Johannes F. Nyffenegger, Laguna Niguel, CA (US); Robert E. Redmer, Laguna Niguel, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 267 days.

(21) Appl. No.: 11/409,627

(22) Filed: Apr. 24, 2006

(65) Prior Publication Data

US 2009/0057540 A1    Mar. 5, 2009

(51) Int. Cl.
  *G01J 1/04*    (2006.01)
  *G01J 1/42*    (2006.01)
  *G01J 5/08*    (2006.01)
(52) U.S. Cl. .................. 250/227.11; 250/216; 398/22; 398/139
(58) Field of Classification Search ............ 250/216; 398/22, 139
See application file for complete search history.

(56) References Cited

U.S. PATENT DOCUMENTS

| 5,434,501 | A | * | 7/1995 | Esman et al. | 250/227.17 |
| 6,978,624 | B2 | * | 12/2005 | Carlson et al. | 62/3.7 |
| 7,174,106 | B2 | * | 2/2007 | Weber | 398/135 |

* cited by examiner

*Primary Examiner*—Seung C Sohn (57) ABSTRACT

A light-powered data acquisition and control system immune to electromagnetic interference employs smart sensors in a network configuration capable of decentralized communication. A smart sensor with integral transducer encloses a microprocessor, fiber optic transceiver, and photovoltaic converter within a Faraday cage. Optical fibers link plural sensors for duplex communication with a fiber optic splitter, which transmits high intensity light to the converter for powering the sensors. The sensor converts analog input from the transducer into bit packets for fiber optic transmission to the network via the splitter. Firmware in the splitter converts the bit packets to network protocol and vice versa enabling data communication among sensors, splitters, and control receivers. Verification algorithms for testing sensors are run automatically by the microprocessor or through commands issued via the network. Mnemonics stored in the sensors provide automatic updating of system configuration.

22 Claims, 6 Drawing Sheets

SMART INTEGRATED DISTRIBUTED LIGHT-POWERED PROCESS CONTROL SYSTEM

The U.S. Government has a paid-up license in this invention and the right in limited circumstances to require the patent owner to license others on reasonable terms as provided for by the terms of Contract No. DASG60-096-C-01555 awarded by the U.S. Army Cruise Missile Defense Command.

BACKGROUND OF THE INVENTION

1. Field of the Invention

The present invention relates to process control and data acquisition systems. More specifically, the invention relates to integrated, fiber optically powered data acquisition, control and data transmission systems.

2. Description of Related Art

Computerized control systems and data acquisition systems have been around since the 1960s. Conventional control systems are used to monitor and control plant process equipment used in industries such as aerospace, chemical and food processing, manufacturing, oil refining, pharmaceutical, power generation, pulp and paper, telecommunications, transportation, waste water treatment, and others. Conventional control systems gather information from a population of local sensors located throughout the plant. The sensors monitor the operational state of plant systems by sensing parameters such as pressure, temperature, flow, voltage, current, radiation, breaker position, and valve position. The sensors transmit signals (e.g. electrical, pneumatic, etc.) that represent these parameters through a transmission path to a central computer. The central computer receives the information as input for algorithms that control plant operations. The central computer also stores historical information in memory, and outputs the information to display terminals to keep the operators apprised of plant conditions. Signals generated by the sensors are typically 4-20 mA or 0-10 V analog, or a stream of digital bits acquired at an appropriate sampling rate. The signals are transmitted along copper transmission lines, or may be transmitted wirelessly in some of the more modern systems.

Many conventional control systems are capable of issuing alarms to alert the operators of an out-of-tolerance condition such as low pressure in a pipe or loss of voltage at a power supply. The system may also perform analysis and control functions, such as determining whether a pressure leak is critical and if so, initiating corrective action by closing an isolation valve. These systems can be relatively simple, such as one that monitors environmental conditions of a small office building, or very complex, such as a system that monitors activity in a jet aircraft or on a nuclear powered ship.

Conventional control systems pose a number of challenges for designers in applications where system components must operate with high reliability. Examples of high-reliability systems are mission-critical systems in military craft, and safety-related systems in commercial nuclear power plants. In these applications, the electrical systems must be qualified to withstand a diverse array of design basis criteria in order to ensure system integrity under extreme operating conditions. These design bases include electromagnetic and radio-frequency interference (EMI/RFI), electromagnetic pulse, electrostatic discharge, nuclear pulse, precipitation static, indirect and direct lighting, ground loop currents, high temperature, radiation, shock and vibration, and seismic events, to name a few. In addition, communications lines must satisfy security criteria to prevent wiretapping and eavesdropping. Extensive grounding and shielding schemes are commonly used to qualify the cabling and electronics to meet these criteria and to withstand design basis events. These schemes add to the cost of the system, and in aircraft applications undesirably add more weight.

The power requirements of conventional control systems can also be troublesome to designers. Some sensors, such as resistance temperature detectors or RTDs, require electrical power from remote sources routed over transmission lines. The potential exposure of the power lines to damage or interference further complicates system integrity. Battery-operated sensors can be used to reduce cabling, but the tradeoff burdens operators with periodic battery replacement and battery charger maintenance.

Conventional control systems also commonly include control loops containing a series of signal conditioning circuits for each individual sensor. These circuits, or modules, include voltage-to-current (or current-to-voltage) converters, low-pass filters, analog-to-digital converters, signal amplifiers, and/or PID controllers. Special enclosures may be needed for containing these circuits and shielding them from noise. In aircraft, the control circuits are inherently noisy, especially those operating at 400 Hz. Noise reduction circuits employing filters, differential amplifiers, ground loop isolators, optical isolators, and elaborate grounding schemes are needed to qualify the system. Despite judicious use of these features, the systems remain susceptible to noise-induced interference.

In more complex control systems, such as those used in large industrial plants or military craft, configuration control is another major concern. Each of the sensors and modules in a control loop must be periodically maintained and accurately calibrated to ensure plant operability. Laboratories are needed for testing and calibration. Technicians must be trained to perform the tests. Maintenance records must be kept current, often by manual entry, to ensure that the configuration of the plant is known at all times. That is, at any given time, every component in the plant must be readily identifiable by its model number and serial number, and the calibration and maintenance histories must be up to date and available for review. This places another substantial burden on plant operations.

SUMMARY OF THE INVENTION

The present invention elegantly streamlines a process control and data acquisition system by exploiting the inherent noise-resistant characteristics of fiber optic technology. The invention employs a plurality of smart sensors in a network configuration capable of communicating with a central computer, or capable of communicating among themselves as a decentralized, distributed network. High intensity light transmitted along optical fibers provides a clean source of power for enabling sensor communications that is inherently immune from electromagnetic interference.

Each smart sensor includes a microprocessor, a fiber optic transceiver, a signal conditioning circuit, and a photovoltaic power converter. These components are enclosed within a Faraday cage to make the sensor immune to any form of electromagnetic or electrostatic interference. A transducer coupled to the sensor conditioning circuit electrically bonded to the cage probes a process parameter such as temperature, pressure, or flow. The conditioning circuit is tailored for each particular transducer, but otherwise the electronics within the cage are identical for every sensor. The microprocessor inputs an analog signal from the conditioning circuit, and converts it to a digital signal for output through the fiber optic transceiver. The transceiver includes a fiber optic transmitter that converts the digital output to an optical signal, and a fiber optic receiver that converts optical input to digital input to the microprocessor. Optical signals enter and exit the sensor through an interface receptacle welded to the cage exterior.

The fibers extend from the sensor interface to a fiber optic splitter, or junction box. The splitter includes an electrical power source, a network interface, a microprocessor, and a fiber optic transceiver equipped with a high intensity laser diode. Each fiber optic splitter serves a plurality of smart sensors, and provides a communications link between a central computer and the sensors, or between the sensors themselves. Firmware within each splitter translates network protocol into bit packets for splitter-to-sensor communication.

The splitter provides power to the sensors by transmitting high intensity light along the optical fibers to the photovoltaic converter of each sensor. The converter converts the light to voltage for powering the electronic components within the Faraday cage. Sensor input, sensor output, and power signals may be carried between splitter and sensor on three separate fibers, or on two fibers where one carries signals and the other carries power, or on a single fiber that carries signals and power. For single fiber transmission, the sensor includes a beam splitter within the Faraday cage for directing high intensity light to the photovoltaic converter and signal-level light to the fiber optic receiver.

The network interface connects each splitter and its associated sensors in either a centralized or a distributed architecture. In the centralized case, communications are routed through a central computer. The computer queries the sensors and issues control signals to control receivers in response to sensor input. In the distributed case, the sensors communicate among themselves and the control receivers via the fiber optic splitters. Verification algorithms for testing sensor operations can be run automatically through commands issued by the central computer or other processors within the network. Mnemonics stored in the sensors and receivers provide automatic updating of system configuration.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. The invention will be better understood upon consideration of the specification and the accompanying drawings, in which like reference numerals designate like parts throughout the figures, and wherein:

DETAILED DESCRIPTION OF THE PREFERRED EMBODIMENTS

The present invention describes a network architecture for a distributed control system of light-powered sensors, light-powered control receivers, and light-powered on-off status monitors. These unique devices, when connected via fiber optic transmission lines comprise an advanced, integrated sensor and control network. The light-powered sensors, or smart sensors, may interface electrically and mechanically as a distributed system, or as a centralized system that can be configured to perform any process control function regardless of size and complexity. The smart sensor accurately and reliably reads an analog signal from a transducer then transmits the result in digital serial format to the central computer over a dedicated full duplex fiber optic line qualified to operate in extremely severe electromagnetic or tactical military environments.

The smart sensor continuously reads the analog transducer and upon receiving a request from elsewhere in the network, instantly returns the analog transducer reading over the same dedicated full duplex fiber optic network. Fiber optic networks are inherently immune against electromagnetic interference of any type and strength, including direct and indirect lightning, ground current loops, radio frequency interference, electromagnetic interferences including pulse and shock. Additionally, the smart sensor includes a digital display permitting simplified and user friendly system maintenance in any industrial or military tactical environment requiring a minimum of specific training, troubleshooting instruments and special tools.

Figure 1:
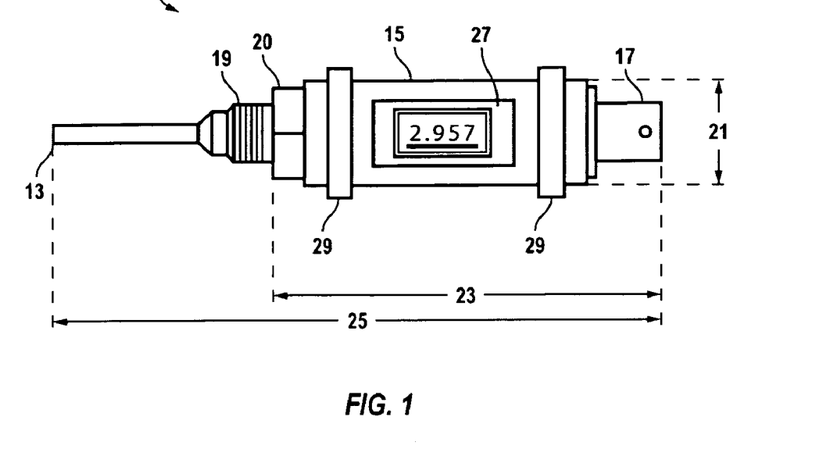
FIG. 1 is a side exterior view of a preferred embodiment of a smart sensor according to the invention.

A detailed description of a light-powered process control system according to the invention begins with one example of a smart sensor 11, which is shown in FIG. 1. This conceptual view of sensor 11 illustrates its main external parts: a transducer 13 on the left side, an enclosure 15 in the center, and a fiber optic interface 17 on the right side. Interface 17 may be a Molex/LumaCon type D38999 Series I, II or III receptacle. In this example, transducer 13 is a temperature probe, such as a thermocouple having stainless steel, inconel, hastelloy, or other suitable construction. However, probe 13 may be any type of transducer or instrument capable of sensing a process parameter and outputting an analog signal, e.g. sensors for measuring pressure, flow, voltage, current, radiation, velocity, acceleration, direction, etc., and also sensors for detecting a change of state such as the position of a breaker or valve.

Probe 13 connects mechanically to enclosure 15 by a fitting 19, which is preferably a standard size such as MS33656-4 or AS4395-04 or equivalent. A hexagonal flange 20, integral to enclosure 15, is configured with internal threads for receiving fitting 19 and facilitating installation and removal of probe 13. Fitting 19 and flange 20 provide a shielded pathway for probe 13 to penetrate the interior of enclosure 15. Enclosure 15 encloses the electronic and fiber optic circuits of sensor 11, and is therefore preferably composed of a conductive material that entirely encloses these circuits. Fiber optic interface 17 is a commercial grade fiber optic receptacle that provides a path for optical signals to the interior of the sensor.

Preferably, enclosure 15, either alone or in combination with interface 17 and fitting 19, forms a welded stainless steel cage designed to survive extremely harsh industrial or military tactical environments and at the same time provide a 100% effective, electrically bonded and positively grounded Faraday shield against electromagnetic interferences of any type and strength. In addition, the mechanical configuration of sensor 11 permits quick replacement in the field. In another embodiment, enclosure 15 forms a Faraday shield that at least partially encloses the components of sensor 11.

Except for the analog sensor employed as transducer 13, the basic construction of smart sensor 11 is identical for all sensing applications. In the embodiment of FIG. 1, diameter 21 is limited to about one inch, and length 23 from interface 17 to fitting 19 is about four inches. Thus, sensor 11 is small and lightweight. Total length 25 is determined according to the diameter of the pipe and the type of flow of the process media, i.e. laminar, turbulent, or transitional. Optional construction features for sensor 11 include a visual display 27 and clamps 29, which will be discussed herein in further detail.

Figure 2:
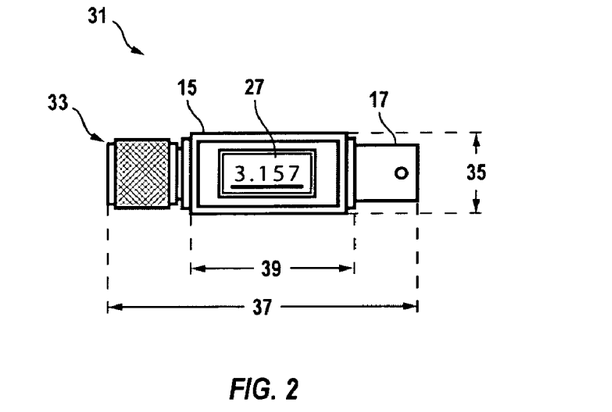
FIG. 2 is a side exterior view of a preferred embodiment of a smart adapter according to the invention.

FIG. 2 shows another embodiment of a smart sensor according to the invention. This embodiment is an adapter 31 designed to upgrade pre-existing sensor technologies to allow them to interface with a fiber optic data acquisition and control system. Adapter 31 is similar in construction to smart sensor 11. Throughout this disclosure, descriptions of the capabilities and operations of the smart sensor 11 apply equally to adapter 31.

Adapter 31 includes an enclosure 15, a fiber optic receptacle 17, and an electrical receptacle 33 that together form a Faraday shield for internal electronics. Receptacle 33 is tailored to connect electrically and mechanically to a mating receptacle on a pre-existing sensor or transducer. For example, where the pre-existing sensor or transducer includes a male electrical receptacle, receptacle 33 would form a female receptacle designed to mate electrically and mechanically to the male receptacle such that adapter 13 becomes an integral part of the pre-existing sensor or transducer. Alternatively, receptacle 33 may be configured to mate electrically and mechanically to a pre-existing sensor or transducer by replacing a cap or other interfacing component. Accordingly, receptacle 33 may take on a variety of different forms, e.g. threaded, flanged, quick-connect, etc., according to the type of pre-existing sensor or transducer to which adapter 13 must connect.

In one embodiment, adapter 31 has a diameter 35 of about 0.8 inches, a length 37 of about 2.75 inches, and a central enclosure 15 having an approximate 1.5 inch length. Adapter 31 may also include a display 27.

Figure 3:
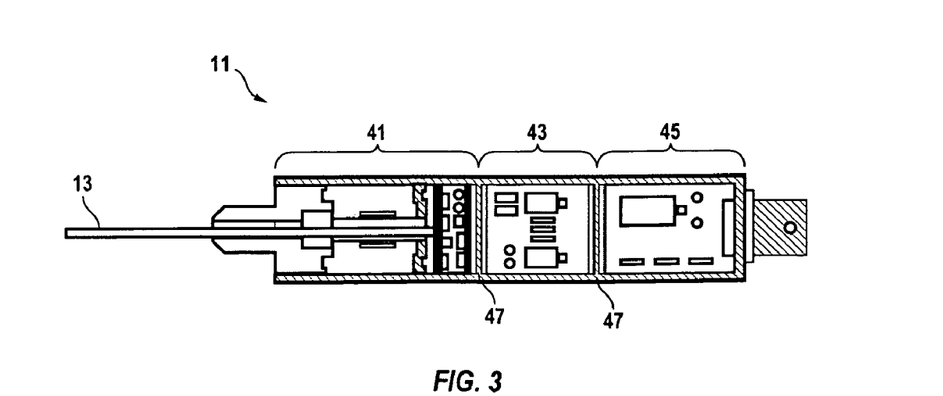
FIG. 3 is a side view and cutaway showing electronic packaging within a preferred embodiment of a smart sensor.

FIG. 3 is a cutaway view of a smart sensor 11 that shows one example of a general layout of electronic components within the Faraday enclosure. The internal electronics are separated into three sections 41, 43 and 45. Metallic baffles 47 are provided between sections to reduce noise and crosstalk, and to mechanically strengthen the enclosure. Section 41 corresponds to the sensing end, and includes signal conditioning electronics for receiving and conditioning an analog signal input from a sensing element of transducer 13, e.g. a sensing element such as a strain gage bridge for pressure or an RTD sensing element for temperature. Section 43 contains electronics required for analog to digital conversion, digital signal processing, visual display driver, and transmitting and receiving fiber optic signals. This section may also include a microprocessor coupled to memory and/or firmware. These devices store sensor historical data, and also software or operational algorithms executable by the microprocessor. Section 45 corresponds to the fiber optic receptacle end, and contains the power conversion and power conditioning electronics, as well as higher power components such as relays and relay drivers. Preferably, state of the art ultra low power CMOS electronic components are used in all electronic circuits of sensor 11 in order to optimize reliability and electromagnetic immunity, and reduce power consumption to an absolute minimum.

Figure 4:
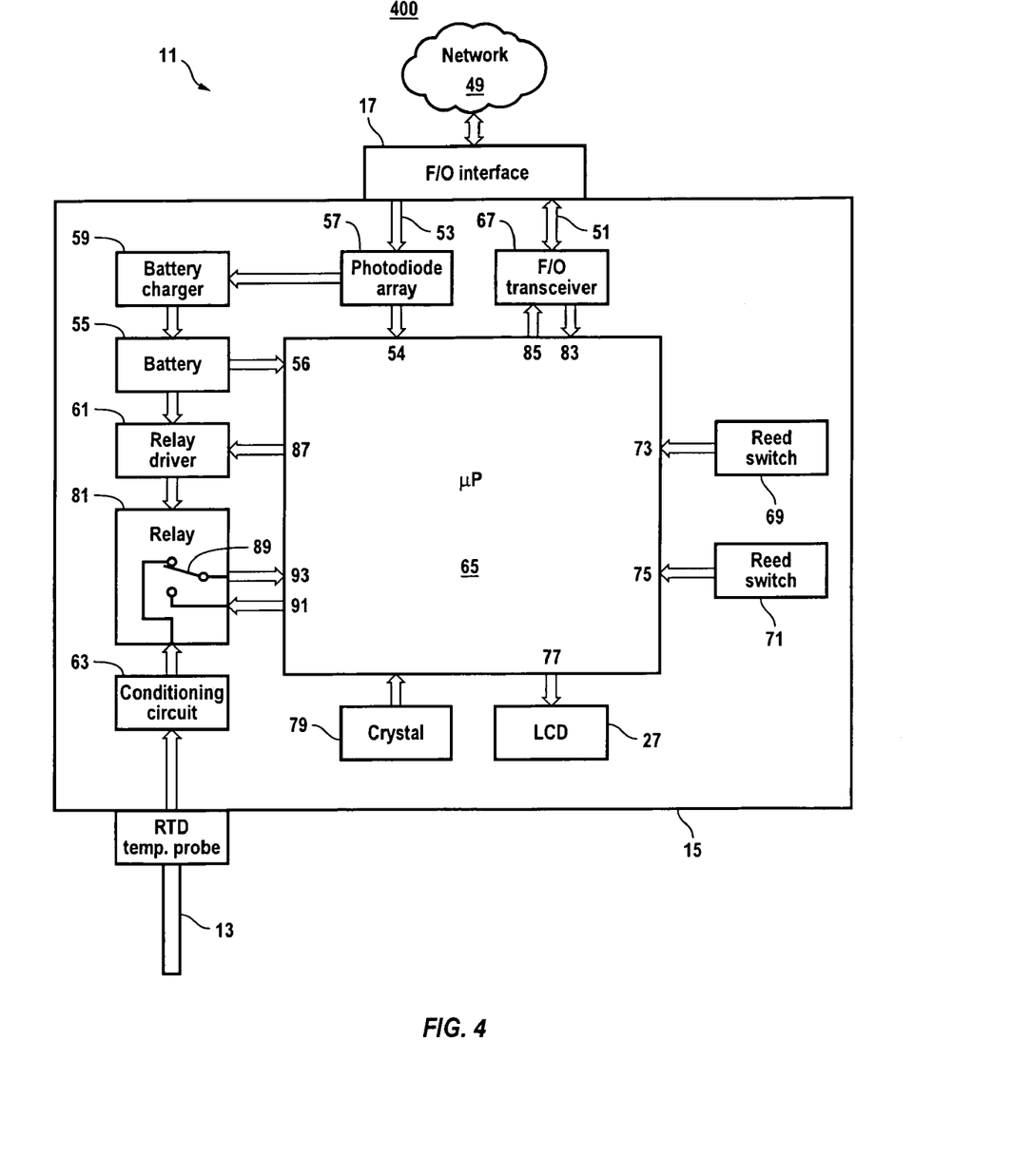
FIG. 4 is a block diagram of an embodiment of a smart sensor having an internal battery and charger.

The operation of one embodiment 400 of a smart sensor 11 is now described in detail with reference to the block diagram of FIG. 4. The block diagram shows the subsystems, components, interfaces, internal connections and flow of data of smart sensor 11. Fiber optic interface 17 provides a means for establishing data communications between sensor 11 and a network 49. In the embodiment of FIG. 4, the fiber optic network link between network 49 and sensor 11 consists of two individual fiber optic links, a full duplex data transmission network link 51 and a battery recharge network link 53. Both link 51 and link 53 are preferably protected by and packaged into a single jacket. There may also be a redundant pair of fibers packaged into the same jacket for added reliability. Communications with network 49 through link 51 are full duplex, which means that a single fiber carries data synchronously transmitted and received simultaneously. That is, a single fiber carries data coming in from network to sensor, and also data going out from sensor to network.

In a normal operating mode, sensor 11 transmits signals to the network that represent a process parameter sensed by transducer probe 13. The signal output from probe 13 is initially an analog signal. The analog signal is conditioned by conditioning circuit 63, and input to microprocessor 65 through relay 81. During this transmission, relay 81 is in a de-energized state, and simply passes the signal to ADC input 93. Signals received at ADC input 93 are converted to digital by microprocessor 65 sampling the analog signals at a rate of about one million samples per second. The digital signal is output as a data packet at serial output 85. This output is transmitted to network 49 through fiber optic transceiver 67 and interface 17. Preferably, the output is a 32-bit packet. Relay 81 is preferably a high reliability magnetic reed type relay with a low resistance type C contact arrangement. Conditioning circuit 63 is customized according to the particular transducer, to provide a desired form of analog signal to microprocessor 65, and to provide excitation voltage or current to the sensor element.

A characteristic feature of sensor 11 is its internal microprocessor 65 that gives rise to the term smart sensor. Microprocessor 65 is capable of executing software algorithms stored in memory or firmware resident in the sensor. For example, digital signals input to microprocessor 65 may be further conditioned by digital filter algorithms such as Bessel, Butterworth, Chebyshev, elliptical, or other transfer functions stored in the firmware. Another class of algorithms may be used to gather and maintain statistics pertaining to the sensor itself, such as how long the sensor has been installed, its minimum and maximum readings, its average reading, etc. Other algorithms may be used for sensor validation to diagnose whether data processed by microprocessor 65 is valid. The validation process is discussed in further detail in the context of validation mode. The memory of a smart sensor may also store configuration data such as serial number, model number, calibration due date, and mnemonics.

Additional functions of smart sensor 11 are now described according to its various operating modes. In one embodiment of a sensor according to the invention, the sensor includes a battery and battery charging circuit. In other embodiments, the battery function is replaced by a photodiode array and/or DC/DC voltage converter. These alternative embodiments are discussed below in further detail. For those embodiments that include the battery, smart sensor 11 may operate in batter charging mode.

Battery Charging Mode

In battery recharge mode, link 53 carries continuous high intensity light energy for recharging an internal battery 55. The high energy light is received by a silicon photodiode array 57. The photodiodes in array 57 are configured in zero bias such that incident light causes a photovoltaic effect that develops a DC voltage across the array proportional to the incoming light energy. In a preferred embodiment, array 57 develops about 5 Vdc. This voltage is coupled to the 5 Vdc power supply input (not shown) to microprocessor 65 and to other power dependent electronics within the sensor, including relay driver 61, conditioning circuit 63, and transceiver 67. The voltage is also coupled to battery charger 59, which continuously charges battery 55. Ideally, charger 59 maintains a voltage across battery 55 slightly greater than the rated voltage of the battery. For the 3 Vdc battery, charger 59 may include a voltage regulator rated for 5V/3.3V conversion.

Battery 55 may be selected from among various battery types. In a preferred embodiment, battery 55 is a long-life 3 Vdc lithium-ion battery. The battery is suitably packaged in a heat sink configuration to permit continuous cooling and easy replacement. Battery 55 provides power to the 3.3 Vdc input (not shown) of microprocessor 65, and also to LCD 27 and crystal oscillator 79. The numerical display on LCD 27 blinks at a 1 Hz rate in the battery recharge mode.

Electrically, a smart sensor is capable of operating in a number of different operational modes, such as standby, data acquisition, validation, identification, and default modes. In a preferred embodiment, battery recharge is continuously executed by sensor 11, concurrently with another mode. In another embodiment, battery recharge mode is the default mode for smart sensor 11. Additional examples of operating modes are provided in the following paragraphs. These modes may be initiated by operator or network command.

LCD Display Activation.

Sensor 11 may be configured with magnetic reed switches 69 and 71 to enable manual selection of output to LCD 27. Each reed switch 69 and 71 is coupled respectively to digital inputs 73 and 75 of microprocessor 65. When a switch 69 or 71 changes state, microprocessor 65 senses the change at input 73 or 75, and in response, causes the output of LCD driver 77 to change. Switches 69 and 71 are activated by small magnetic C-clamps 29 clipped to enclosure 15 on the outside of sensor 11. The C-clamps allow a technician in the field to easily survey a sensor manually, if desired.

Since each input 73 and 75 can assume one of two states, then four different states of LCD 27 are possible. For example, in one configuration, a clamp 29 placed on the left side of sensor 11 may cause LCD 27 to display volts received from probe 13. A clamp 29 placed on the right side of sensor 11 may cause LCD 27 to display the internal temperature of microprocessor 65 in degrees. A clamp 29 placed on the right and left sides of sensor 11 may cause LCD 27 to display the voltage across battery 55. When all C-clamps are removed, the LCD display may be inactive.

Smart Sensor Normal Operating Mode

Microprocessor 65 executes the software and firmware loaded into sensor 11 on power-up. The digital circuit immediately starts cycling at a 1000 HZ rate established by a parallel resonant crystal 79. A set of high priority self-diagnostic routines run automatically during cycling. In one embodiment, the cycling routines include (i) reading the signal provided by transducer 13, (ii) reading the voltage across photodiode array 57 at input 54, and (iii) reading the temperature of microprocessor 65. During these routines the firmware (i) validates the data received from transducer 13 to ensure accuracy, (ii) checks photodiode array 57 voltage limits to ensure adequate power, and (iii) checks microprocessor 65 temperature limits to ensure proper operating conditions. The cycling routine may also include a step for reading the voltage across battery 56 (or DC/DC converter 56 in FIG. 5) at input 56, and checking this reading to ensure adequate power. After all data has been verified, one or more processing algorithms may be applied to the data received from transducer 13. These include DSP algorithms for filtering, smoothing, sampling and/or trending the data. Sensor 11 is now prepared to respond to a request from network 49 by instantly formatting a data packet based on the request and transmit this packet over the network.

Standby/Sleep Mode

If sensor 11 fails to receive a request for data from network 49 within 2 seconds, then it goes into Standby/Sleep Mode. In this mode, sensor 11 shuts down non-essential activity (such as executing low priority algorithms or driving the LCD) in order to conserve maximum power. Upon receipt of a data packet from network 49, sensor 11 wakes up and resumes normal operation.

Validation Mode

Validation mode permits a requester (i.e. a controller or central computer linked to network 49) to verify the performance and accuracy of a smart sensor 11. Validation is accomplished by a central computer or other network-linked controller issuing a validation command and transmitting a test signal of known magnitude and dynamics to sensor 11 via interface 17. In response, sensor 11 processes the test signal and retransmits it to the network. The absolute static or dynamic accuracy of sensor 11 can subsequently be calculated in a minimum of time by comparing the known signal with the signal retransmitted by sensor 11.

With reference again to FIG. 4, one method for implementing a validation operation is now described. When a validation command is received over network 49, microprocessor 65 signals relay driver 61 via digital output 87. Relay driver 61 then energizes relay 81, causing contact 89 to change state from its normal, de-energized state to validation state. In validation state, relay 81 disconnects the input from probe 13, and connects DAC output 91 to ADC input 93. Upon completion of the switching process, sensor 11 performs the following validation algorithm without requiring any additional mode commands from the requestor.

In the first step of the validation algorithm, microprocessor 65 receives and processes a fiber optic test signal from the requester through transceiver 67. Transceiver 67 converts this signal to a digital electronic signal and transmits it to serial input 83, preferably as one or more 32-bit packets, which may represent a static or dynamic signal. In the next step, microprocessor 65 converts the validation data into a proportional analog voltage signal at a desired accuracy and conversion rate, and routes the analog signal to DAC output 91. With relay 81 in validation state, the analog signal is routed back into microprocessor 65 through ADC input 93.

In the next step, ADC input 93 converts and formats the proportional analog voltage signal into a serial digital signal. Microprocessor 65 then outputs the digital signal through serial output 85 to transceiver 67, which converts the signal into a serial fiber optic signal. In the final step, transceiver 67 transmits the serial fiber optic signal to the requestor over the fiber optic network in a specified format and at a specified data transmission rate.

This allows the requester to validate sensor 11 by comparing the test signal received to the test signal transmitted. The validation is advantageously carried out while sensor 11 is in service, without having to disable the sensor or perform manual testing or calibration.

During execution of the validation algorithm, microprocessor 65 may output a display signal through LCD output 77. In one example, the data displayed on LCD 27 during the validation process is the analog signal voltage at ADC input 93, in Vdc. When commanded by the requester, smart sensor 11 de-energizes validation relay 81 to disconnect DAC output 91 from ADC input 93, and reconnect the output of transducer 13 to ADC input 93. LCD 27 display may then return to normal mode.

In a preferred embodiment of a smart sensor 11, the following commercial parts may be used: Fiber optic transceiver 69 consists of an Agilent or Hewlett-Packard model HFBR-2412T receiver and model HFBR-1414T transmitter, or MIL spec equivalent components manufactured by OPTEK Technology. Microprocessor 65 is an Analog Devices series ADuC702x precision analog microcontroller.

Identification Mode

When commanded by a requestor, smart sensor 11 continuously transmits to network 44 historical data from memory accessible by microprocessor 65 that is specific to the sensor itself. The following list is one example of a set of historical data stored in a sensor of the present invention that may be of interest to a system operator:

1) serial number (who it is);
2) model number (what it is);
3) mnemonics (where it is, i.e. information concerning the particular application performed by the sensor in its in-plant location. The mnemonic data may include an equipment tag number or component identification number that corresponds to plant design documents);
4) range (what it does);
5) total accumulated hours of operation;
6) transducer calibration due date;
7) a summary of absolute static accuracies at past calibrations, starting with the most recent calibration;
8) a summary of transmission errors, including times and dates; and
9) a summary of validations including times, dates, and calculated deviations between test signals received and test signals re-transmitted.

Error Detection

If the smart sensor detects any error in the data received from transducer 13, or an error in sensor operations, such error is reported to the network. A central computer receiving this report marks the sensor as having an offline status. Local indication of error status may be provided by microprocessor 65 causing LCD 27 to blink an error code.

Smart Sensor Types

Smart sensors according to the invention may be constructed for any type of transducer. Except for a conditioning circuit 63, which (if needed) must be customized for the transducer, the rest of the smart sensor components are identical regardless of transducer type. Thus, smart sensors may be manufactured for measuring any parameter of interest to a plant or craft operator, including temperature, pressure, flow, voltage, current, distance, velocity, acceleration, radiation, altitude, depth, direction, or other metrics such as valve or breaker position or state changes such as hours of operation, number of cycles, etc.

Control receivers may also be constructed. In a control receiver, the transducer and conditioning circuit are replaced by an analog or digital output from microprocessor 65. For example, DAC output 91 may issue a control signal for driving a component in a downstream controller, such as a relay, circuit breaker, or pilot valve. The control signal causing DAC output 91 may originate from the central computer, from another smart sensor on the network, or from the microprocessor of the same control receiver. A short discussion of several examples of the many possible types of smart sensors and control receivers follows:

A smart temperature transmitter may be constructed by equipping a smart sensor with a temperature sensor, such as a standard RTD temperature sensing element or a precision thin film platinum RTD element embedded in a sheath compatible with the process media.

A smart pressure transmitter may be constructed from a smart sensor equipped with an integral absolute gauge or differential pressure transducer.

A smart voltage transmitter may be constructed from a smart sensor using voltage measuring circuitry as the transducer. Similarly, a smart current transmitter consists of a smart sensor having a transducer and conditioning circuit that measure current.

A smart metric transmitter may be constructed by replacing the transducer with one or more digital counters that input a count directly to a digital input of the smart sensor microprocessor. In one embodiment, the smart metric transmitter accepts up to four digital inputs and performs arithmetic calculations used for preventive maintenance purposes.

A smart sensor that transmits acceleration, vibration, or displacement data may also be constructed from a smart sensor according to the invention. For this transmitter, the transducer is an external piezoelectric accelerometer. The sensor accepts one piezoelectric accelerometer signal and instantaneously calculates and transmits acceleration, velocity or displacement data for preventive maintenance purposes.

A smart watchdog may be constructed by employing a watchdog counter in place of the transducer and associated signal conditioning circuit of a smart sensor. The smart watchdog performs standard watchdog functions for computerized equipment and transmits specific status information of the equipment monitored.

A smart control receiver for valve control may be constructed from a smart sensor. This receiver transmits a control signal from an analog output of its microprocessor. In another embodiment, the receiver may include a feedback loop from a position sensor. The feedback signal is transmitted to the receiver in similar fashion as in the smart voltage transmitter.

Similarly, a smart control receiver may be constructed for controlling a DC valve using a digital output from the microprocessor and analog voltage position feedback.

It is also possible to construct a sensor from a combination of any of the above sensor types within a single sensor enclosure. For example, a smart combination pressure and temperature transmitter may be constructed from a smart sensor equipped with an integral combination of a temperature element and an absolute gauge or differential pressure transducer. In another example, a smart sensor comprises a combination pressure, temperature, and flow transducer. In combination sensors, each transducer may be a separate component, or a single probe capable of sensing multiple signals may be used as the transducing element. Each sensed signal may be separately conditioned for input to the smart sensor microprocessor. In a combination sensor, all transducers and sensing elements are compatible with the process media being measured.

Figure 5:
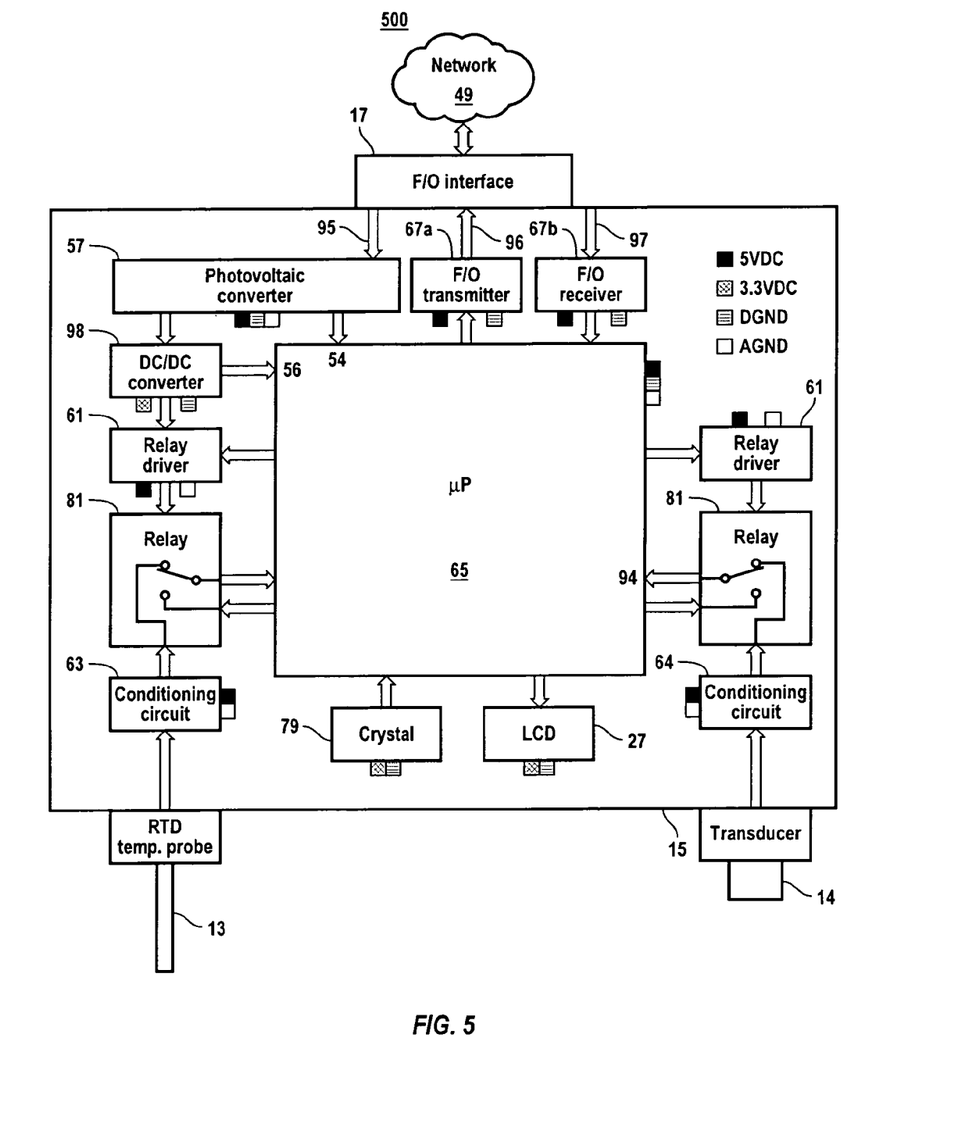
FIG. 5 is a block diagram of another embodiment of a smart sensor configured for direct light-to-power conversion.

FIG. 5 presents another embodiment of a smart sensor according to the invention. Smart sensor 500 is configured to receive three separate optical fibers through interface 17.

Fiber 95 is dedicated to transmitting high intensity light energy for powering sensor 500. Fiber 96 is dedicated to transmitting fiber optic data signals from fiber optic transmitter 67a to network 49 through interface 17. Fiber 97 is dedicated to receiving fiber optic data signals from network 49 that are directed to fiber optic receiver 67b through interface 17. This arrangement is an alternative to full duplex transmission.

High intensity light energy passing through fiber 95 is received by photovoltaic converter 57, where the energy is converted to voltage. The voltage is coupled directly to DC/DC converter 98 and to the 5 Vdc input (not shown) to microprocessor 65. Converter 98 outputs a converted DC voltage, which is coupled directly to crystal 79, LCD 27, and other components of sensor 500 rated for the converted voltage. Thus, sensor 500 operates without an internal battery or battery charger. In one embodiment, photovoltaic converter 57 produces 5 Vdc, and DC/DC converter 98 converts the 5 Vdc to 3.3 Vdc. In another embodiment, DC/DC converter 98 is eliminated from the circuit, in favor of a photovoltaic converter that produces 3.3 Vdc directly, or any other voltage required by ultra low power CMOS components.

Sensor 500 is further configured for dual transducer operation. A first transducer 13 is connected to microprocessor 65 identically as in the embodiment of sensor 400. A second transducer 14 is connected to microprocessor 65 in similar fashion. A second signal conditioning circuit 64, is tailored to interface functionally with transducer 14 and output an analog signal of desired form to ADC input 94 through a second validation relay 81. This configuration may be used for the combination pressure and temperature transmitter previously discussed. Additional transducers in excess of two may be added to a smart sensor, provided that its microprocessor has sufficient input capability, and that power limitations are not exceeded. One such sensor is a combination flow, pressure, and temperature transmitter.

Figure 6:
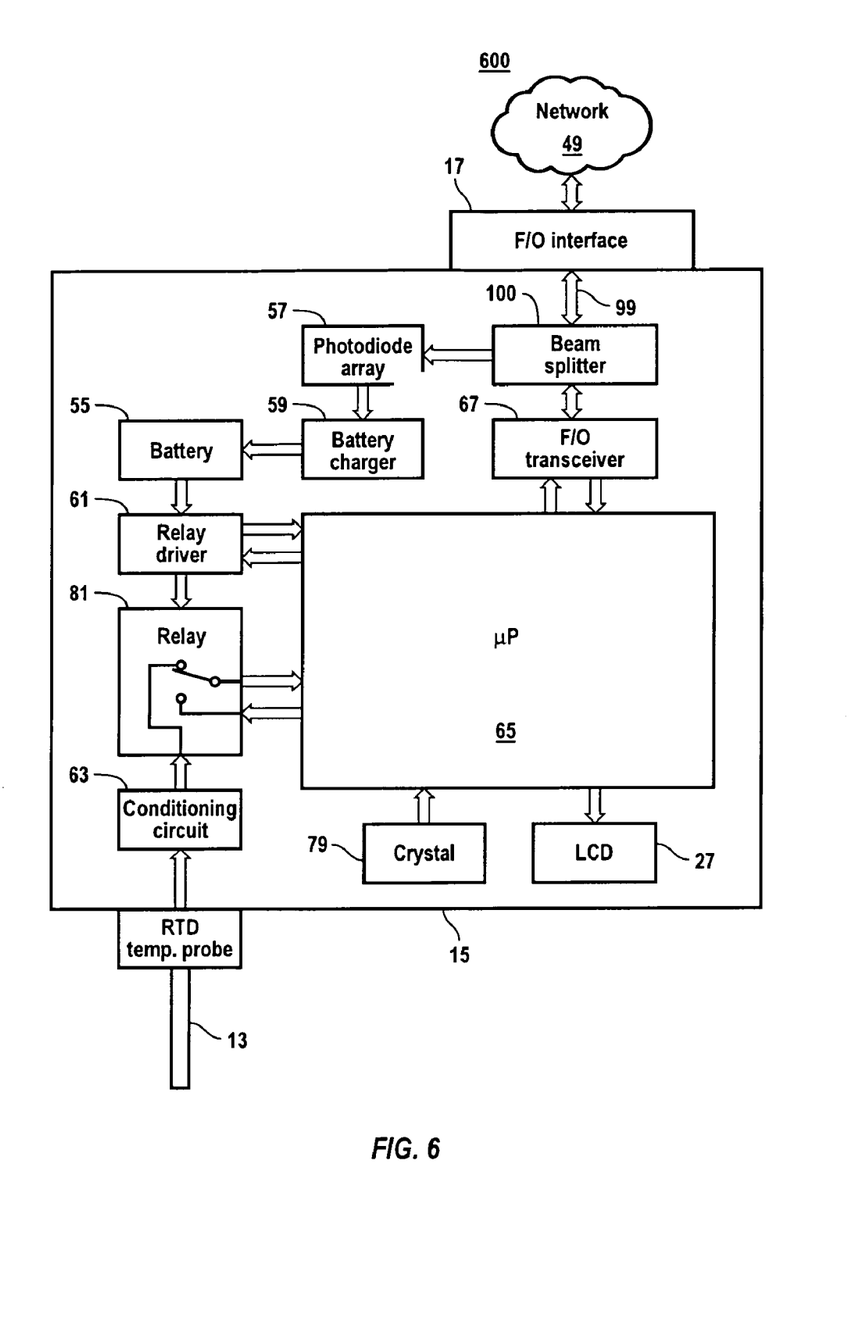
FIG. 6 is block diagram of a preferred embodiment of a smart sensor configured for full duplex fiber optic transmission.

FIG. 6 illustrates another embodiment of a smart sensor according to the invention. Sensor 600 is equipped for single fiber transmission, which means that all light signals, including high intensity signals carrying power and all fiber optic signals carrying data, are transmitted through interface 17 along a single optical fiber. The combined signal is received by beam splitter 100.

Beam splitter 100 separates the incoming power signal from the data signals, and redirects it to photodiode array 57. In one embodiment, this is accomplished by confining high intensity light intended for power transmission to a different wavelength than that used for transmitting data. Ideally, data and power wavelengths should be separated by a factor of about two. In one example, data signals are confined to a 1400 nm wavelength, and power is confined to an 800 nm wavelength.

In one implementation, beam splitter 100 contains one or more prisms selected for their dispersion characteristics. As incident light passes into beam splitter 100, the prisms separate the light into its constituent wavelengths. The prisms redirect the power wavelength to photodiode array 57 and the data wavelength to transceiver 67.

Sensor 600 may be configured for direct power conversion, or it may be configured with a battery and battery charger (as shown). Otherwise sensor 600 operates identically to the embodiments previously discussed.

Fiber Optic Splitter

Figure 7:
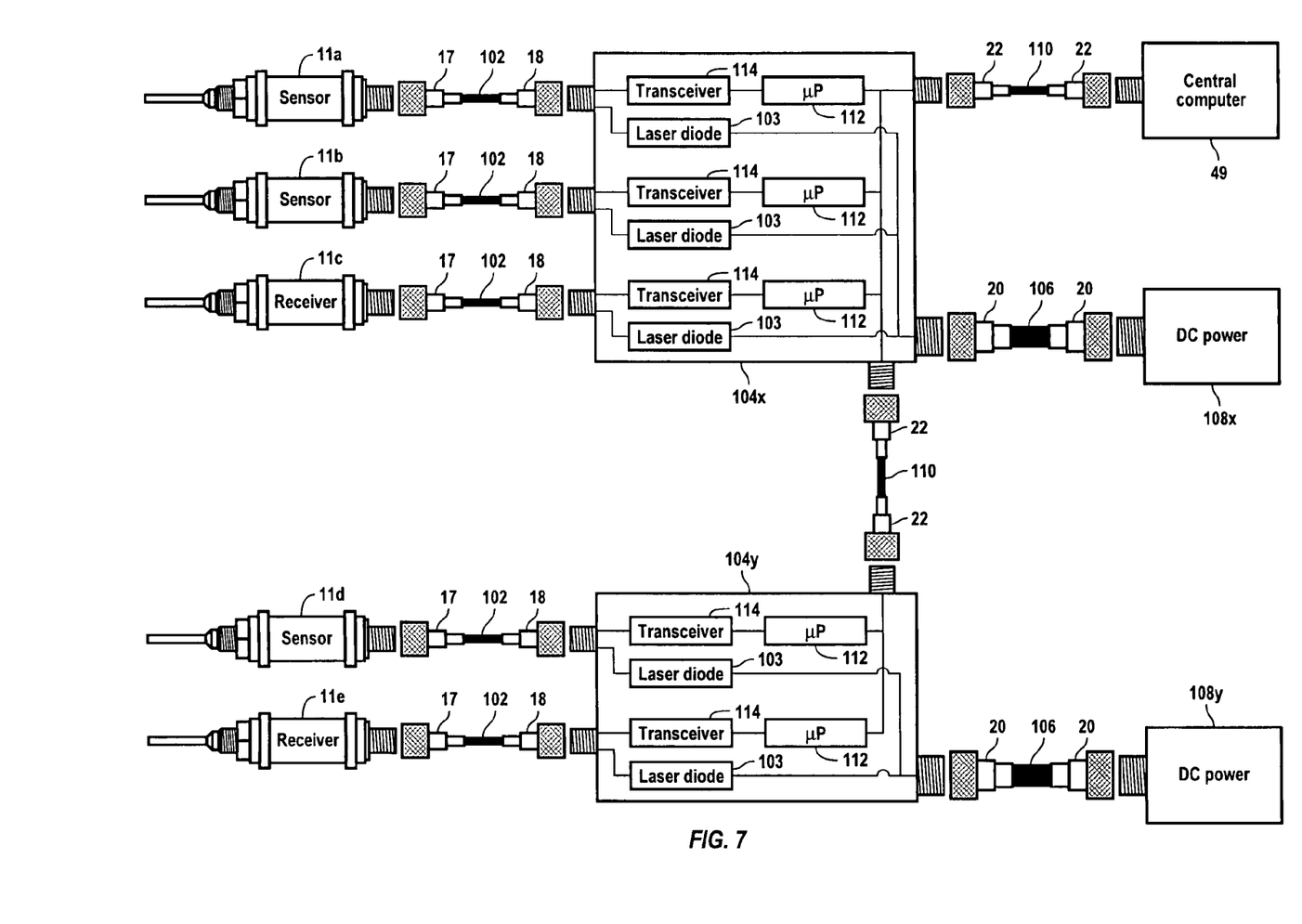
FIG. 7 is a schematic showing network connections made through fiber optic splitters.

FIG. 7 shows a schematic diagram of network connections for smart sensors made through fiber optic splitters. The left side of the figure shows a plurality of smart sensors and/or control receivers 11a, 11b, 11c, 11d and 11e. Each of these sensors is coupled through its corresponding fiber optic interface 17 to a fiber optic transmission line 102. Each transmission line 102 contains one or more optical fibers, and may extend to a length of up to 500 feet or more. Longer transmission lines are possible; however, one or more repeaters may be required for lengths in excess of about 500 feet. The maximum length of fiber that does not require a repeater depends on the state of advancement in the fields of optical fiber, laser diode, and photovoltaic converter technologies. In a preferred embodiment of the invention, no repeaters are used. The number of fibers in each line 102 depends on whether the sensor is equipped for single fiber, full duplex, or three-fiber communication. The line 102 may also include one or more additional redundant fibers for higher reliability.

Each line 102 runs from its corresponding sensor or control receiver 11a, 11b, 11c, 11d, 11e to a fiber optic splitter 104x or 104y. Each splitter 104x and 104y receives lines 102 through a fiber optic interface 18. Each interface 18 is a receptacle similar or identical to interface 17, and may be a commercially available Molex/LumaCon type D38999 receptacle and mating straight cable plug. In one embodiment, optical fiber is commercial grade 3×62.5/125 micron multimode type. In the schematic, splitter 104x serves three sensors 11a, 11b and 11c, and splitter 104y serves two sensors 11d and 11e. However, each splitter can service a far greater number of sensors and control receivers, up to an addressability limit of about 1024. In addition, any two splitters in the network may be linked together by a network cable 110, as shown in the schematic. Cable 110 may be 2×62.5/125 micron multimode type or equivalent suitable for transmitting via an Ethernet interface 22.

Each splitter 104x and 104y receives power through an interface 20 which receives electrical cable 106 that carries power from an external source 108x or 108y, respectively. Sources 108x and 108y may be the same source, or may be two different sources. In one embodiment suitable for aircraft applications, each source 108x and 108y is linked to a nominal 28 Vdc power supply. Cable 106 may be any commercial grade power cable, such as #16 AWG 3x copper or equivalent. Power received in each splitter via cable 106 is converted to high energy light using high intensity laser diodes 103. The high energy light is transmitted along optical fibers through line 102 to provide power to each sensor and control receiver.

In the example shown, splitter 104x is coupled to central computer 49 through a network cable 110. Splitter 104y is coupled to central computer 49 through cable 110 routed through splitter 104x, as shown. A type D38999 interface receptacle 22 is provided for cable 110 at each junction.

For each sensor or receiver served by a splitter 104x or 104y, the splitter includes a microprocessor 112, a transceiver 114, and a laser diode 103. These components form a dedicated signal processing and transmission channel for each sensor or receiver. Furthermore, each splitter 104x or 104y (or any of additional splitters in the network) links each sensor or control receiver to the network directly or through another splitter or splitters. In this manner, any one sensor or receiver, e.g. sensor 11a, is maintained in fiber optic communication with any other sensor or receiver, e.g. sensor or receiver 11b, 11c, 11d, or 11e.

Microprocessors 112 enable Ethernet-to-serial protocol conversion of data incoming from the network, and serial-to-Ethernet protocol conversion of data incoming from a smart sensor or control receiver. Each microprocessor 112 is coupled to a transceiver 114. Using algorithms stored in memory or firmware, each microprocessor 112 translates network packets received from central computer 49 (or from elsewhere on the network) into serial bits for transmission to smart sensors or control receivers via a transceiver 114. Each transceiver 114 transmits the serial bits to its downstream sensor. Incoming serial bits from one or more smart sensors are routed through the corresponding channel from transceiver 114 to microprocessor 112. Using additional algorithms, each microprocessor 112 encapsulates the serial bits for transmission according to network protocol. For example, a plurality of serial bit packets may be converted to a byte sequence and transmitted in the frame reserved for data in Ethernet protocol. In a preferred embodiment, serial bits communicated to and from the sensors and receivers are 32-bits in length.

Each laser diode 103 receives DC power from source 108$x$ or 108$y$, converts the power to high intensity light, and transmits the light to its corresponding sensor or receiver via optical fiber in line 102. In one embodiment, light signals transmitted via a transceiver 114 is combined with the high intensity light from diode 103 and transmitted as a combined signal along a single optical fiber. In another embodiment, the combined signal is transmitted along two redundant fibers.

Preferably, microprocessor 112 is a Maxim/Dallas Semiconductor type DS80C400 network microcontroller. Transceiver 114 may be identical to the transmitter/receiver set used in the smart sensor. In one embodiment, network card 109 is a model DP83846A Ethernet transceiver.

Network Architecture

Figure 8:
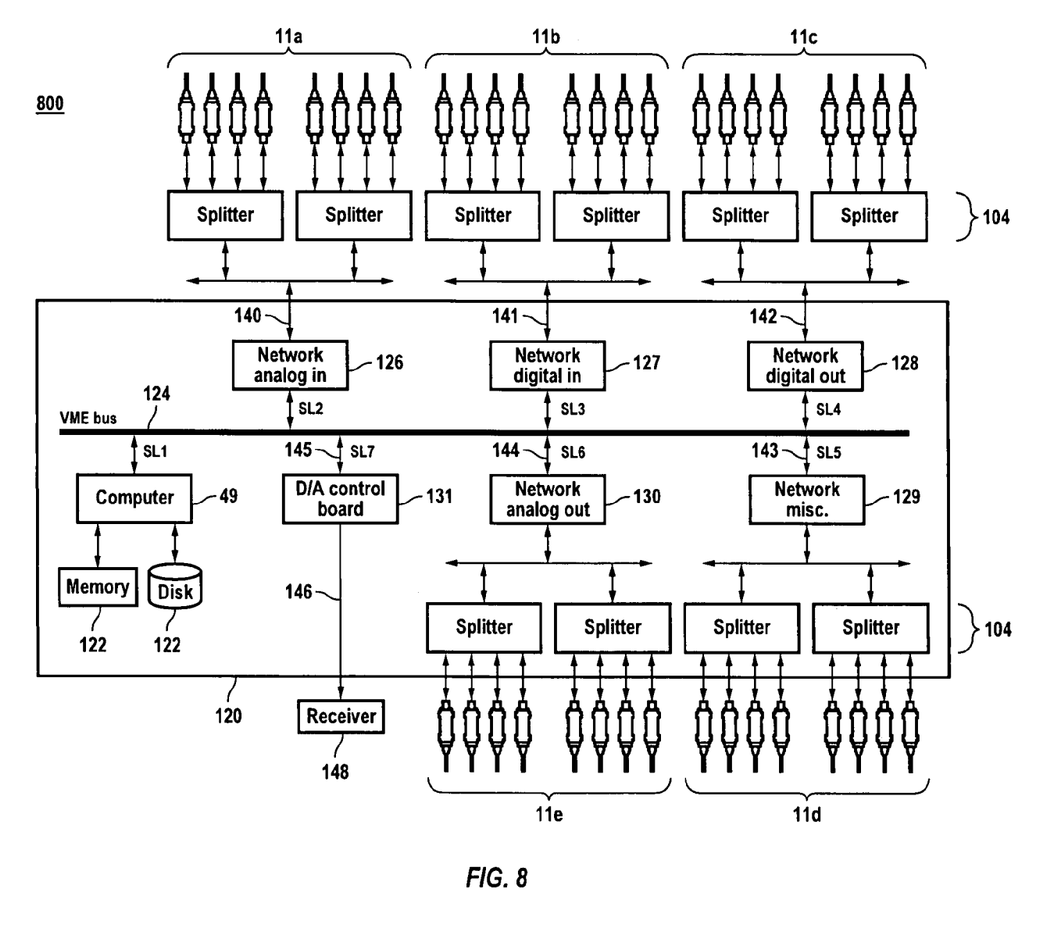
FIG. 8 is a block diagram of a network architecture for a light-powered process control system using smart fiber optic sensors.

The block diagram of FIG. 8 presents one embodiment of a centralized network architecture 800 using smart sensors, control receivers, and fiber optic splitters in accordance with the invention. This architecture is scalable and thus suitable for use as any large or small scale process control system needed for military, industrial, or commercial applications.

In a centralized process control system, a controller chassis 120 encloses a central computer 49 coupled to one or more memory devices 122 and a VME bus 124. Memory devices 122 may be solid state disks, laser disks, removable media, RAM, ROM, EEPROM or any other suitable computer memory device or combination thereof. Custom drivers for communicating with the various smart sensors are stored in memory 122 for access by computer 49. Computer 49 couples to VME bus 124 in a slot SL1. VME bus 124 provides a plurality of additional slots SL2 through SL7 for connection of peripherals. For illustration purposes, only six slots and six peripheral devices are connected to VME bus 124, although it is possible to connect many other peripherals to many other slots that are not shown.

The embodiment of FIG. 8 shows a plurality of network cards plugged into the VME bus peripheral slots, each card linked to a plurality of smart sensors. While it is possible for a single network card to handle all network communications for computer 49, a plurality of network cards is preferred because, from a protocol standpoint, it reduces the probability of data collisions among competing transmissions. In a preferred embodiment, each of cards 126, 127, 128, 129 and 130 is an Ethernet transceiver, such as a model DP83846A device.

The first peripheral device is network card 126 in slot SL2. Card 126 provides a communications link between computer 49 and a plurality of smart sensors 11$a$, each configured for analog input. Card 126 communicates through network link 140 to two fiber optic splitters 104. Splitters 104 each serve a plurality of smart sensors 11$a$ that transmit analog inputs representing process parameters such as temperature, pressure, flow, etc.

The next peripheral is network card 127 in slot SL3. Card 127 provides a communications link between computer 49 and a plurality of smart sensors 11$b$ configured for discrete input. Card 127 communicates through network link 141 to two fiber optic splitters 104. Each splitter 104 serves a plurality of smart sensors 11$b$ configured for providing discrete input. The discrete input is typically an on/off input indicative of a change of state such as the position of a microswitch or contact switches.

The third peripheral is network card 128 in slot SL4. Card 128 provides a communications link between computer 49 and a plurality of control receivers 11$c$ configured for discrete output. Card 128 communicates through network link 142 to two fiber optic splitters 104. Each splitter 104 serves a plurality of control receivers 11$c$ configured for providing digital output such as an on/off signal for starting a motor or pump, or for opening or closing a valve.

The fourth peripheral is network card 129 in slot SL5. Card 129 provides a communications link between computer 49 and a plurality of smart sensors 11$d$ configured for transmission of miscellaneous data. Card 129 communicates through network link 143 to two fiber optic splitters 104. Each splitter 104 serves a plurality of smart sensors 11$d$ that transmit miscellaneous data such as historical data related to equipment maintenance. The miscellaneous data may represent total motor running time, a total count of circuit breaker actuations, the total number of battery recharge cycles, etc.

The fifth peripheral is network card 130 in slot SL6. Card 130 provides a communications link between computer 49 and a plurality of control receivers 11$e$ configured for transmission of analog output. Card 130 communicates through network link 144 to two fiber optic splitters 104. Each splitter 104 serves a plurality of control receivers 11$e$ that transmit analog control signals. An analog control signal may be needed for controlling a variable valve position, variable speed motor, etc.

The sixth peripheral is digital-to-analog control board 131 in slot SL7. Board 131 provides a path for high-speed analog control signals in high precision applications which cannot tolerate processing delays introduced through network protocol. Such applications rely on immediate feedback from a sensor to effect high-precision continuous adjustment in a process, such as the position of a needle valve in a fuel line that responds to minute changes in pressure in order to maintain a constant fuel supply. In one embodiment, feedback may be received from a smart sensor (such as a sensor 11$a$) through the network, and control signals may be sent directly to receiver 148 via transmission line 146.

In another embodiment, the process control function of control board 131 may be entirely localized within a smart sensor that functions as a controller with a self-contained control loop. That is, the smart sensor acts as an analog output controller and also uses its integral transducer to sense an effect of its output, which it feeds back to its internal microprocessor for fine-tuning the controller output. This way, network processing delays may be eliminated from the control loop.

The architecture depicted in FIG. 8 may be modified to create a decentralized or distributed network of smart sensors. In the distributed network, all components within chassis 120 are disconnected from the network, including computer 49, bus 124, and cards 126-131. The population of fiber optic splitters remains interconnected in fiber optic communication through splitter-to-splitter connections such as line 110 shown between splitters 104$x$ and 104$y$ of FIG. 7. An indefinite number of smart sensors and control receivers may be interconnected in this fashion. Individual smart sensors are therefore able to communicate with other smart sensors and with control receivers to automatically carry out various process control functions according to algorithms stored in the sensors. Other specialized smart sensors within the network may be configured for operator interface, where desired. For example, a smart sensor may be coupled to a visual touchscreen display to present maintenance-related information to a human operator, and to change the contents of the display in response to an operator query.

A light-powered data acquisition and control system according to the invention greatly simplifies design, manufacturing, maintenance, and qualification. Its advantages include:

1) Reduced cost for analog signal and process control cabling through use of fiber optics.

2) Reliable performance and greater system availability due to elimination of susceptibility to electromagnetic interference, such as the effects of direct and indirect lightning, radio frequency interference, electromagnetic pulse and shock, precipitation static, coronas, ground loops and electrostatic discharge.

3) Design simplification by elimination of signal conditioning electronics, power cables, barriers, optical isolators, elaborate cable shielding and grounding schemes, and ground loop isolators.

4) Secure transmissions of analog measurement and digital control signals communicated via optical fiber.

5) Reduced time required for system validation and calibration, and reduced cost for system troubleshooting, maintenance and service.

6) More reliable and cost-effective configuration control through storage of sensor configuration, calibration, and verification information in retrievable sensor or controller memory.

7) Improved preventive maintenance and usage tracking by storing sensor metrics in the sensor or controller.

The invention has been presented in an illustrative style. The terminology employed throughout should be read in an exemplary rather than a limiting manner. While various exemplary embodiments have been shown and described, it should be apparent to one of ordinary skill in the art that there are many more embodiments that are within the scope of the subject invention. Accordingly, the invention is not to be restricted, except in light of the appended claims and their equivalents.

What is claimed is:

1. A sensing system, comprising:
   one or more sensors, each sensor having a transducer for sensing a physical variable and generating signals representative of the sensed variable, a fiber optic transceiver for generating optical signals representative of the signals from the transducer, and a power converter for converting optical power signals to voltage for powering the sensor;
   a splitter connected to the one or more sensors, for each sensor the splitter having a transceiver for receiving optical signals from the sensor and sending optical signals to the sensor, a microprocessor for communicating with the transceiver in the sensor, and an optical power source for transmitting optical power signals to the sensor; and
   a computer sending signals to the microprocessor in the splitter or receiving signals from the microprocessor in the splitter.

2. The system of claim 1 wherein the power converter in the sensor includes a photovoltaic converter.

3. The system of claim 2 wherein the microprocessor and transceiver draw power from the photovoltaic converter.

4. The system of claim 1 wherein the fiber-optic transceiver and power converter in the one or more sensors are enclosed by a Faraday cage.

5. A data acquisition system employing a network of sensors, the system comprising:
   at least one splitter connected to the network of sensors, for each sensor the splitter having a transceiver for receiving optical signals from the sensor and sending optical signals to the sensor, a microprocessor for communicating with the transceiver, and an optical power source for transmitting optical power signals to the sensor;
   a computer sending signals to the microprocessor in the splitter or receiving signals from the microprocessor in the splitter;
   each sensor, in the network of sensors, including a transducer for sensing a physical variable, and generating signals representative of the sensed variable, a fiber optic transceiver for converting the transducer generated signals to optical signals, and a power converter for converting optical power signals to voltage for powering the sensor; and
   optical fiber linking the at least one splitter to the power converter in each sensor and to the transceiver in each sensor.

6. The system of claim 5 wherein the fiber-optic transceiver and power converter in each sensor is enclosed within a Faraday cage.

7. The system of claim 5 wherein the splitter and each sensor are linked by the optical fiber carrying optical power signals data transmitted by the splitter, and data transmitted by the transceiver.

8. The system of claim 7 wherein the splitter and each sensor are linked by one optical fiber carrying optical power signals and a second fiber carrying both data transmitted by the splitter and data transmitted by the transceiver.

9. The system of claim 7 wherein the splitter and each sensor are linked by one optical fiber carrying optical power signal, a second optical fiber carrying data transmitted by the splitter, and a third optical fiber carrying data transmitted by the transceiver.

10. The system of claim 7 wherein each sensor further comprises a beam splitter for splitting light received through the optical fiber into a power beam directed to the converter and a data beam directed to the transceiver.

11. The system of claim 5 wherein each sensor further comprises a microprocessor.

12. The system of claim 11 wherein the microprocessor includes at least one analog input coupled to the transducer, at least one digital input coupled to the transceiver in the splitter, and at least one digital output coupled to the transceiver in the splitter.

13. The system of claim 11 wherein the microprocessor comprises firmware for running a sensor validation algorithm in response to a command from the computer.

14. The system of claim 11 wherein the power converter in each sensor provides power to the microprocessor in that sensor.

15. A light-powered process control system, comprising:
   a central computer having a processor coupled to memory;
   at least one network interface card;
   a data bus coupling the processor to the at least one network interface card;
   one or more splitters, each splitter having a source of high intensity light and a connection to the at least one network interface card;
   a plurality of sensors, each sensor having a transducer for sensing a physical variable and generating a signal representative of the sensed variable, a fiber optic transceiver for converting signals representative of the sensed variable to optical signals, and a power converter for converting optical power signals to voltage for powering the transceiver; and optical fiber coupling the splitters to the sensors.

16. A noise resistant light-powered process control system comprising:

one or more sensors, each sensor having a transducer for sensing a physical variable and generating signals representative of the sensed variable, a fiber optic interface, and a Faraday cage enclosing (i) a fiber optic transceiver coupled to the interface, (ii) a microprocessor receiving the signals from the transducer and sending signals to the fiber optic transceiver, and (iii) a photodiode array for converting high intensity light received through the interface to voltage for powering the microprocessor and the fiber optic transceiver; and a central computer receiving signals from the one or more sensors and issuing a command in response thereto.

17. The system of claim 16 wherein the photodiode array receives the high intensity light from the fiber optic transceiver.

18. A light-powered distributed process control system, comprising:

a plurality of smart sensors, each sensor having a transducer for sensing a physical variable and generating signals representative of the sensed variable, a microprocessor for converting the signals from the transducer to digital signals, a fiber optic transceiver for converting the digital signals to optical signals, and a power converter for converting optical power signals to voltage;

one or more splitters, each splitter linking some of the plurality of smart sensors by optical fiber to a network, each splitter having a high intensity light source for transmitting through the fiber to the power converter in the smart sensor.

19. The system of claim 18 further comprising at least one control receiver, wherein at least one of the splitters links the control receiver by optical fiber to the network.

20. The system of claim 19 wherein the at least one control receiver is powered by high intensity light transmitted by a splitter through the fiber.

21. The system of claim 19 wherein the at least one control receiver is in fiber optic communication with all the smart sensors in the network.

22. The system of claim 19 wherein the at least one control receiver is in fiber optic communication with at least one of the smart sensors through the at least one fiber optic splitter and through a second fiber optic splitter.

* * * * *